(No Model.)

M. ANTHONY.
FAUCET AND BUSHING.

No. 487,207. Patented Nov. 29, 1892.

Witnesses
Jesse Heller
Philip L. Masi

Inventor
Mark Anthony
by E. W. Anderson
his Attorney

UNITED STATES PATENT OFFICE.

MARK ANTHONY, OF BERKELEY, ASSIGNOR TO THE GOLDEN GATE SAFETY FAUCET COMPANY, OF SAN FRANCISCO, CALIFORNIA.

FAUCET AND BUSHING.

SPECIFICATION forming part of Letters Patent No. 487,207, dated November 29, 1892.

Application filed January 30, 1892. Serial No. 419,763. (No model.)

*To all whom it may concern:*

Be it known that I, MARK ANTHONY, a citizen of the United States, and a resident of Berkeley, in the county of Alameda and State of California, have invented certain new and useful Improvements in Faucets and Bushings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
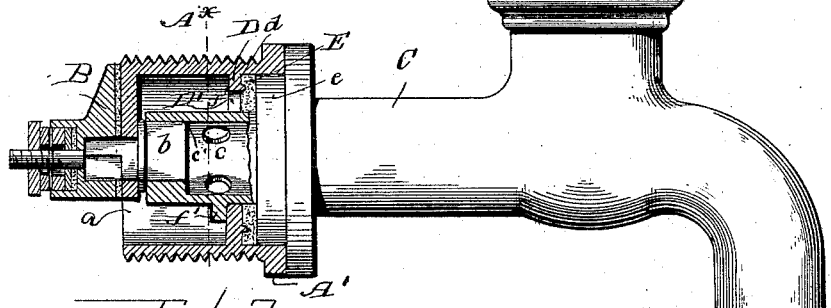
Figure 2:
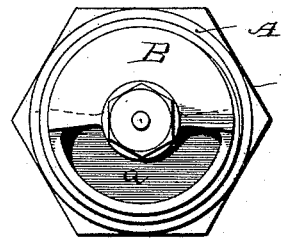
Figure 5:
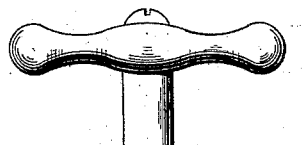
Figure 3:
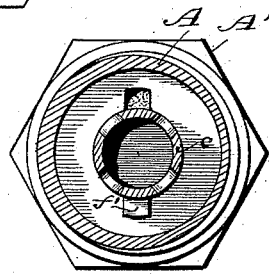
Figure 6:
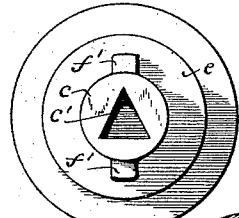
Figure 4:
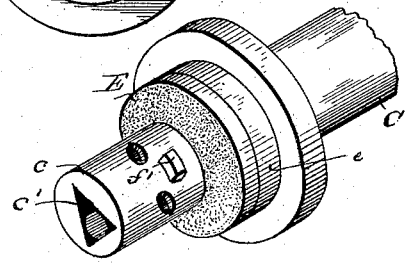

Figure 1 of the drawings is a vertical longitudinal section of faucet and bushing. Fig. 2 is an end view of same, looking from the rear. Fig. 3 is a transverse section on line $x$. Fig. 4 is a perspective view of faucet. Fig. 5 is detail section of bushing, and Fig. 6 is an end view of Fig. 4.

This invention has relation to certain new and useful improvements in faucets and valves therefor; and it consists in the novel construction and combination of parts, as hereinafter specified.

The invention relates more particularly to certain improvements upon similar devices, for which Letters Patent were granted me April 6, 1886, No. 339,252, and March 31, 1891, No. 449,513; and it consists especially in the manner of fastening the tap or faucet in the bushing or valve.

In the accompanying drawings, the letter A designates a cylindric sleeve or bushing having a valve-port $a$ in its inner end and rotary valve B similar to those described in the patents above referred to and having an area somewhat greater than that of the port, so as to prevent leaking.

C designates the tap or faucet, which has a central hollow stem perforated at its inner portion, as shown at $c$, and having in its end a triangular opening $c'$ for engagement with the similarly-shaped head $b$ of the valve B.

Near the outer end of the bushing A is an interior annular flange D, having formed on its upper surface a seat $d$ for a packing-ring E, seated around the stem of the faucet or tap and held against a flange or shoulder $e$ thereon. Below this flange the interior wall of the bushing is formed with an inclined way or groove $f$ or with double oppositely-inclined ways or grooves, which are designed to receive a lug $f'$ on the lower portion of the stem or two of said lugs formed at diametrically-opposite points, as may be desired. In the patents above referred to these ways or grooves were formed in the bushing above the seat-flange for the packing, the lugs on the stem being formed on the enlarged shoulder portion, against which is held the packing-ring. This requires the bushing to be of considerably-larger diameter in order to provide sufficient space to form the lugs and ways, which, as will be seen, effect the connection between the faucet and bushing. This large diameter of the bushing is found to be objectionable in some instances, as it requires too large a hole to be made in the staves of the barrel or package to which it is applied; but by forming the ways or grooves below the seat-flange and the lugs on the inner end of the stem, as above described, the bushings may be made of considerably-less diameter and at the same time afford sufficient chamber or space therein for the requisite flow of liquor into the faucet. This construction also permits the seat-flange for the packing to be formed near the outer end of the bushing, thereby permitting said bushing to be considerably shorter. This is an important feature, for the reason that in the case of small kegs or packages, or those made with thin staves an elongated bushing, such as was heretofore necessary, projects too far into the interior of the barrel, preventing all the contents being drawn therefrom.

When it is desired to tap a barrel or other package having one of these devices, the faucet or tap is inserted in the bushing into engagement with the head of the valve. A rotary movement is given the faucet, the lug or lugs therein entering the inclined way or ways and drawing and compressing the packing-ring into its seat and making a perfectly-tight joint thereat. This takes place before the valve has been turned sufficiently far to begin to uncover the port $a$. In this manner a perfectly-tight upper interior joint is formed before the port is opened, so that any leakage is effectually prevented; also, when a reverse movement is imparted to close the valve the port *a* is entirely closed before the joint formed by the packing-ring is broken.

The exterior of the bushing A is formed with a screw-thread for retaining it in place, and its upper flanged head A' is usually of angular form to permit the application of a wrench thereto for its ready insertion and removal. In some instances, however, it may be desired to insert the bushing A in a sleeve or thimble in the tap-hole of the barrel or package, and in such cases the exterior thread will be omitted, as may also be the angular wrench-seat portion.

The seat-flange D is cut away at D' to permit the passage therethrough of the lug *f'*.

Having described this invention, what I claim as new, and desire to secure by Letters Patent, is—

In a faucet and bushing for barrels and other packages, the short cylindric bushing A, having a valve-port in its inner end, a lap sector-valve working on the inner end of said bushing and controlling said port, the interior surrounding flange near the outer end of said bushing, and the inclined raised way, in combination with a faucet adapted to enter said bushing into engagement with the stem of said valve and form a joint with said flange, substantially as specified.

In testimony whereof I affix my signature in presence of two witnesses.

MARK ANTHONY.

Witnesses:
PHILIP C. MASI,
GEORGE H. PARMELEE.